(12) United States Patent
Richet et al.

(10) Patent No.: US 6,588,609 B1
(45) Date of Patent: Jul. 8, 2003

(54) DISPLAY DEVICE STAND WITH ROTATABLE STORAGE

(75) Inventors: Bruno L. A. Richet, San Mateo, CA (US); Michael A. Simonian, San Francisco, CA (US)

(73) Assignee: Kensington Technology Group, a division of ACCO Brands, Inc., San Mateo, CA (US)

( * ) Notice: Subject to any disclaimer, the term of this patent is extended or adjusted under 35 U.S.C. 154(b) by 0 days.

(21) Appl. No.: 09/759,873

(22) Filed: Jan. 12, 2001

Related U.S. Application Data

(60) Provisional application No. 60/175,719, filed on Jan. 12, 2000, and provisional application No. 60/231,733, filed on Sep. 11, 2000.

(51) Int. Cl.$^7$ .................................................. A47F 5/02
(52) U.S. Cl. ...................... 211/163; 248/349.1; 248/918
(58) Field of Search ........................ 211/163; 248/349.1, 248/918

(56) References Cited

U.S. PATENT DOCUMENTS

| | | | |
|---|---|---|---|
| 3,608,739 A | 9/1971 | Duboff | 211/40 |
| 3,637,172 A * | 1/1972 | Diesbach | 248/460 |
| 4,424,904 A | 1/1984 | Applegate, Jr. | 211/40 |
| 4,534,471 A | 8/1985 | Zahn et al. | 211/39 |
| 4,762,237 A * | 8/1988 | Newton | 211/115 |
| 4,826,261 A | 5/1989 | Nademlejnsky | 312/11 |
| 5,020,043 A * | 5/1991 | Kohler | 369/36 |
| 5,031,779 A | 7/1991 | Szenay et al. | 211/40 |
| 5,090,783 A | 2/1992 | Chimner | 312/11 |
| 5,176,264 A | 1/1993 | De Palma | 211/40 |
| 5,244,270 A * | 9/1993 | Parker | 312/270.2 |
| 5,385,397 A | 1/1995 | Chow | 312/9.45 |
| 6,075,758 A * | 6/2000 | Wu | 369/36 |

* cited by examiner

*Primary Examiner*—Daniel P. Stodola
*Assistant Examiner*—Erica B. Harris
(74) *Attorney, Agent, or Firm*—Townsend and Townsend and Crew LLP

(57) ABSTRACT

A display device stand with rotatable storage apparatus including a stand having a top and a first cylindrical tube extending downward from the top. The apparatus further includes a carousel beneath the stand top. The carousel has a base and a second cylindrical tube extending upward from the base. The first and second cylindrical tubes have a coaxial relationship relative to one another. A base plate elevates the carousel and maintains an elevated position of the second cylindrical tube relative to the first cylindrical tube. The elevated carousel rotates about the first cylindrical tube of the stand and on the base plate without touching a surface upon which the stand and base plate rest. The carousel may be divided into storage compartments having varying shapes.

27 Claims, 8 Drawing Sheets

DISPLAY DEVICE STAND WITH ROTATABLE STORAGE

RELATED APPLICATIONS

This application claims the benefit of U.S. provisional application No. 60/175,719 filed Jan. 12, 2000, and U.S. provisional application No. 60/231,733 filed Sep. 11, 2000.

BACKGROUND OF THE INVENTION

This invention generally relates to storage devices and more particularly to a rotatable storage device having a stand for a computer monitor or the like.

Rotatable storage devices are known in the prior art. Many of these devices are used to store CDs, disks or the like. For instance U.S. Pat. No. 3,608,739 to Duboff describes a revolving storage table. A base member, preferably metal, is provided for support of the device. A throughbore extends through the center portion of the base. An elongated pole extends upward from the base, the lower end of the bore being internally threaded. A nut is threaded onto the pole to secure the pole in a vertical position. A first collar means is then placed over the pole and slid down to the bottom adjacent the base member. A first tray means is slid down the pole and contacts the collar means. The tray is removably journaled for rotation on the pole. A second tray including a central bore is also removably journaled for rotation on the pole a distance above the first tray. A second collar means is disposed on the pole immediately beneath the second tray for supporting the second tray.

U.S. Pat. No. 4,424,904 to Applegate, Jr. describes a rotary display rack for albums. The rack has a circular, planar turntable. The turntable has a vertically extending cylinder affixed to a circular hub at the center of the turntable. The cylinder is inserted into the hub and can be secured to the hub by a fastener. The cylinder has an open top and bottom. A closure member or a cap may be inserted into the top opening of the cylinder. The turntable is rotatably attached to a rectangular base or support and is coupled to the base by means of a circular ball bearing plate. The ball bearing plate allows the turntable to rotate with respect to the plate.

U.S. Pat. No. 4,534,471 to Zahn et al. discloses a clip and support rack. In one embodiment of the invention, circular clip supports for stamps, form storage bins for small items such as paper clips. The clip supports are adapted to be mounted in a free standing tier arrangement by a central post. Each hub has a reduced threaded portion on its upper end that threadably receives the lower portion of a post segment. The upper portion of each post segment is received within the hub of the next higher unit so that the unit can rotate about the post about a vertical axis in the manner of a carousel or Lazy Susan.

U.S. Pat. No. 4,826,261 describes a carousel holder for computer disks. The holder has a circular stationary base plate with an upper surface having rotary wheels. The carousel includes a carousel wheel that has an annular track on its bottom surface that is supported for rotation by the base plate wheels. The carousel wheel has a hub, which rotates around a stationary central cylindrical tube. The hollow cylindrical housing has a central circular aperture, which is secured coaxially to the central tube. A sliding door is formed in the cylindrical sidewall of the stationary housing. A radially outwardly extending rim of the carousel wheel extends beneath the bottom of the cylindrical housing. U.S. Pat. No. 5,020,043 to Kohler describes a carousel like unit for the storage of floppy disks that rotates about a vertical axis. The storage assembly rests upon a base and is enclosed by a cover. The cover contains a door, which is hinged at two points and pivots about a vertical axle. Within the cover is found guide plates for holding disks vertical. A vertical axle and spacers holds the guide plates apart. The storage apparatus can be rotated about the vertical axle. The under surface of the guide plate, adjacent to the base, rests upon a friction reducing washer.

U.S. Pat. No. 5,031,779 to Szenay et al. discloses a carousel for storing and displaying compact disk albums or cases. The carousel comprises one or more reels rotatably mounted on a turntable base. The reels include a central core and a pair of parallel spaced apart disks. A CD case fits between the pair of circular disks and is held upright with ribs. Two circular disks may be snapped together by fitting the central core of the top disk into the central core of the lower disk. A reel may be coupled together with another reel by inserting a portion of the core that extends below the bottom surface of the lower disk of one of the reels into a circular opening found within the upper disk of a second reel. The reels are vertically aligned with a pair of dimensioned detents that facilitates the turning of all of the reels at once. The base assembly includes a stationary circular tray and a plurality of wheels riding in the circular tray. At least one reel is placed upon the tray and rides on the wheels.

U.S. Pat. No. 5,176,264 to DePalma describes a circular stackable display case for floppy disks or compact disks, which consists of a mechanism for radially storing the disks and a mechanism for rotating the case. The radially storing mechanism includes a bottom circular platter member having a central aperture and a plurality of spaced apart radial slots for storage on the top surface of the bottom platter. The mechanism also includes a top circular platter member with a central aperture and a plurality of spaced apart radial slots. The rotating mechanism includes a spindle member insertable up through the central aperture of the bottom platter. A cap member is insertable down through the central aperture in the top circular platter to engage with the spindle member and to allow for rotation of the radially storing mechanism. The spindle member includes an upright barrel with an internally threaded bore. The cap member includes an externally threaded boss that threadably engages with the internally threaded bore. An externally threaded boss can engage with a central threaded aperture in a circular base member for stabilizing the spindle member on a flat horizontal surface.

U.S. Pat. No. 5,385,397 to Chow describes a stackable storage rack that receives compact disk cases. The rack includes a turntable with radially extending grooves for receiving the objects. A bearing assembly rotatably mounts a turntable to a base. The bearing assembly comprises a disc on the bottom of the turntable and a base beneath the disc. A spindle extends vertically upwards from the base and rotatably through an aperture in the disc. There is a washer mounted on the bottom of the disc and a similar second washer beneath the first washer mounted on the base. The washers allow for smooth rotation of the turntable on the base.

Though these devices act as rotatable storage devices they fail to provide a mechanism that would allow for a computer monitor or the like to be supported on the storage device. Additionally, they are quite complex and require numerous components for assembly.

U.S. Pat. No. 5,090,783 to Chimner describes a rotatable disk storage assembly within a housing upon which a monitor may rest. The storage assembly has a base, an enclosed cover with a front access opening, and a rotatable wheel with dividers to provide storage compartments for diskettes. The storage compartments are accessible upon rotation of the wheel. The rotatable wheel is supported on a bearing assembly including grooves formed on the upper surface of the base and the lower surface of the wheel to facilitate rotation. The assembly also includes ball bearings supported in a bearing race held in between the base and the rotatable wheel. The base, the rotatable wheel and the cover include a magnetic shield for protecting disks when the enclosure is supported between a central processing unit and a monitor.

This apparatus is big, bulky and not easily transported. The apparatus also requires many components, including ball bearings and a bearing race, therefore is not easily manufactured or assembled. Furthermore, it fails to provide storage for a wide variety of items.

Therefore, it is an object of the invention to provide a rotatable storage apparatus having a stand for securely supporting a computer monitor or the like.

It is another object of the invention to provide a rotatable storage apparatus and stand that provides storage for a wide variety of items.

It is another object of the invention to provide a rotatable storage apparatus and computer stand that can be easily manufactured and assembled.

It is a further object to provide a rotatable storage apparatus and monitor stand that allows for use of space around a computer monitor that is normally difficult to access for use.

SUMMARY OF THE INVENTION

The above objects have been met by a combined support and rotary storage apparatus for use with a computer monitor, or the like. The apparatus includes a stand having a top and a first cylindrical tube extending downward from the top. In one embodiment, the top further includes a peripheral skirt extending downward from the top.

The apparatus further includes a carousel beneath the stand top. The carousel has a base and an opening within the base. A second cylindrical tube extends upward from the base. The first and second cylindrical tubes have a coaxial relationship relative to one another. The carousel, including the second tube, is elevated. A base plate elevates the carousel and clips secure the carousel to the stand.

The elevated carousel rotates about the first cylindrical tube of the stand and on the base plate without touching a surface upon which the stand and base plate rest. Therefore, scratching of the table surface is prevented.

A major challenge exists in designing devices, which are able to support the weight of a computer monitor, or objects of the like yet, that are easy to assemble and manufacture. In the present invention, a computer monitor, or the like, rests on top of the stand of the apparatus. The first cylindrical tube of the stand rests upon the surface beneath the carousel, providing support. The first cylindrical tube supports most of the weight of the computer monitor. Ribs may be incorporated in the stand top to strengthen the surface that the computer monitor sits upon and to provide some additional support. The apparatus shape is desirable, in that it does not require much material to manufacture, yet it is sturdy.

Additionally, a peripheral skirt, extending downward from the top of the apparatus may be included. The skirt supports some of the monitor weight however, primarily prevents the stand from tipping side to side. As the peripheral skirt supports significantly less weight than the first cylindrical tube, it need not and does not surround the entire stand. Therefore, little material is required to manufacture the skirt. Spaces within the skirt provide a user with easy access to the storage carousel.

The carousel may be divided into storage compartments having varying shapes. A lip, found around the edge of the carousel, may be used to form a wall of one or more compartments. Compartments may be used to store a user's items, such as keys, CDs, pens or paperclips, thus using the space around a monitor that often times goes unused.

DETAILED DESCRIPTION OF THE INVENTION

Figure 1:
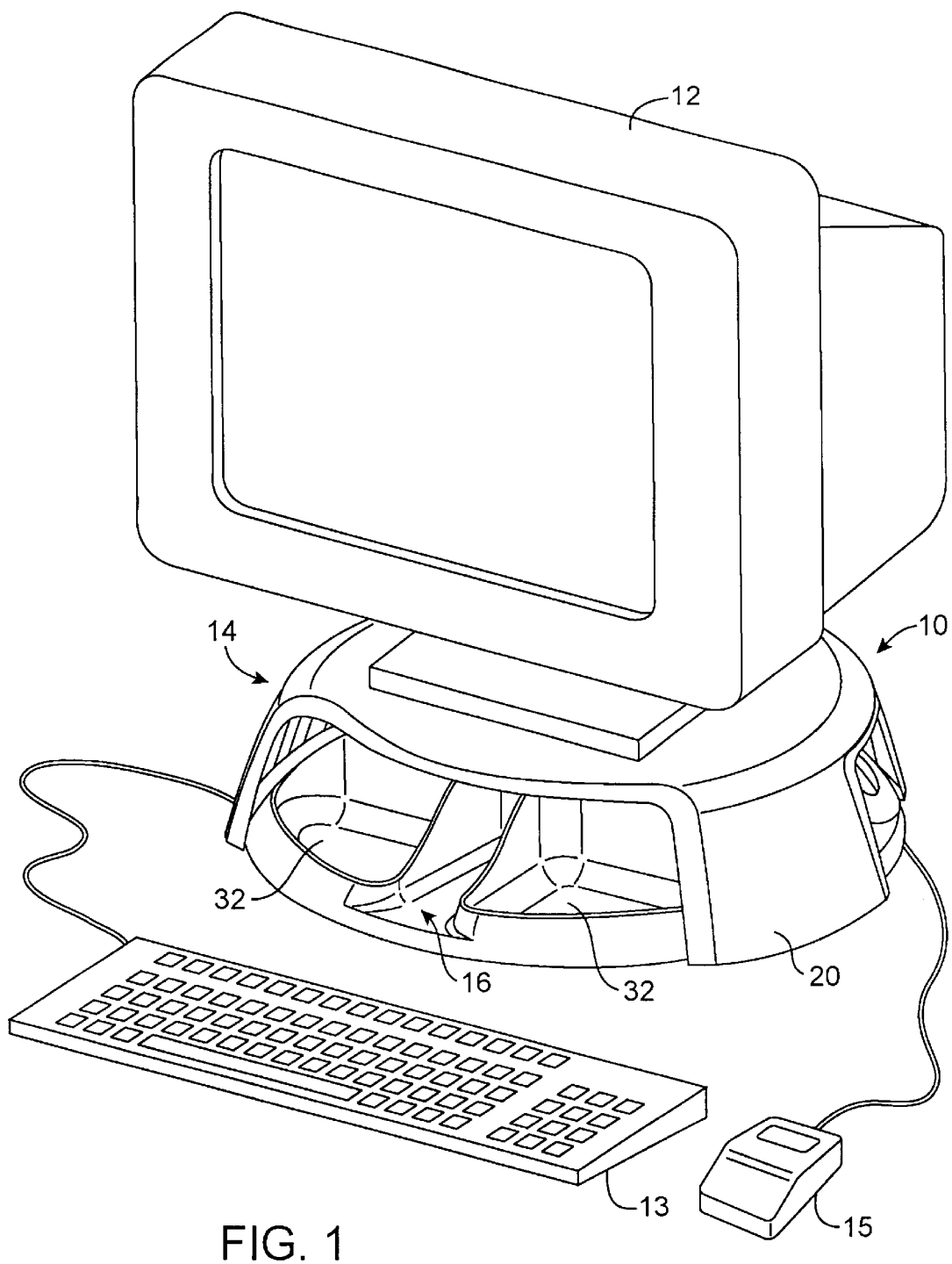
FIG. 1 is a perspective view of the rotary and storage apparatus of the present invention.

Referring to FIG. 1, a rotary and storage apparatus 10 of the present invention is shown. The apparatus 10 includes an immobile stand 14 and a rotating carousel 16. The stand 14 has a thickness of approximately 3 mm, for example. Both the stand 14 and the carousel 16 may be manufactured using inexpensive injection molded plastics, such as polycarbonate. Other materials that may be used to manufacture the apparatus 10 comprise, but are not limited to, thermoplastics, metals, wood, glass and ceramics. Furthermore, the parts of the apparatus have been designed for "simple draw" tooling. Therefore, expensive side pulls or lifters in the tools are not required. The plastic material may be translucent allowing the user to see through the stand 14 to view contents stored within compartments 32 of the carousel 16.

Figure 2:
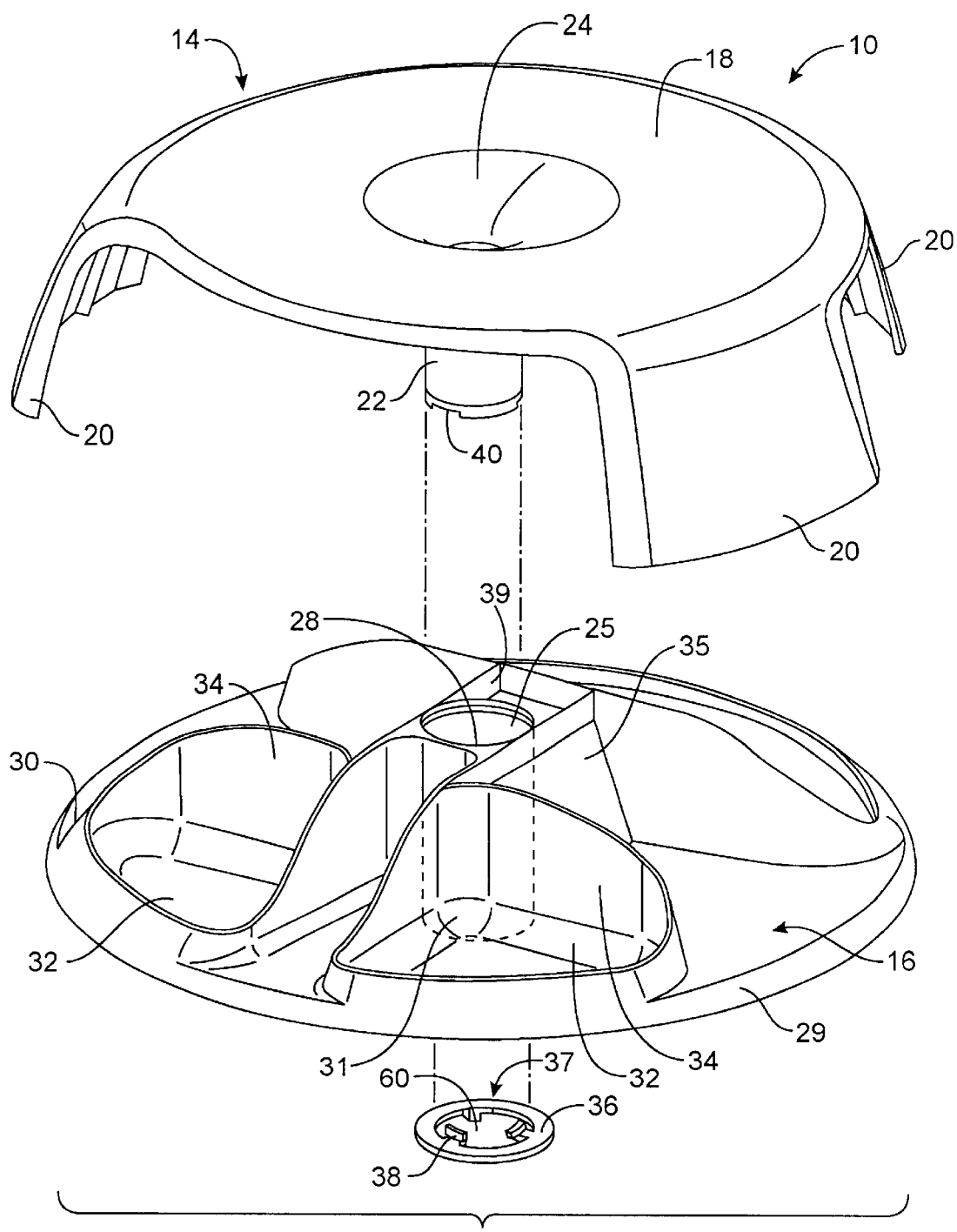
FIG. 2 is an exploded view of rotary and storage apparatus of FIG. 1.

A computer monitor 12, with keyboard 13 and mouse 15, is shown in association with the apparatus 10. The apparatus 10 supports the computer monitor, or the like. For example, the apparatus 10 may support various items such as, but not limited to, a printer or other display device such as a television, laptop computer, or a personal digital assistant. The apparatus 10 has a height of approximately 4 inches for example. This stand height allows the monitor to sit at a height that is ergonomically desirable for viewing by the user. Referring to FIG. 2, it is seen that the stand 14 of the apparatus 10 includes a top surface 18 having a first central opening 24. A first cylindrical tube 22, supporting a large percentage of the weight of the monitor, extends downward from the opening 24. Tube 22 has, for example, a diameter of approximately 1–3 inches and a thickness of approximately 3 mm. A peripheral skirt 20 extends downward from the top surface. The skirt supports some of the monitor weight however, primarily prevents the stand from tipping side to side. As the peripheral skirt supports significantly less weight than the first cylindrical tube, it need not and does not surround the entire stand. Therefore, little material is required to manufacture it. Spaces within the skirt provide a user with easy access to the storage carousel. The top surface 18 is pictured to be circular in shape, however other shapes may be used.

The carousel 16 of the apparatus 10 includes a base 29 a second central opening 25, and a second cylindrical tube 28 extending downward from the opening 25 and upward from the base 29 having an opening 31. Tube 28 has a diameter for example, slightly larger than tube 22 and a thickness of approximately 3 mm. The base 29 is pictured to be circular in shape, however other shapes may be used.

The carousel 16 includes compartments 32 that may be used to store various items such as, but not limited to, keys, pens, paper clips, scissors, business cards, clips, adhesive tape, push pins and letter openers. A lip 30 found along an outer edge of the carousel 16 acts as a compartment wall. It has a height of, for example, approximately 1 inch, allowing users to easily slide objects out of the storage compartments 32. Other compartment walls 34 are present in various shapes and sizes. Compartments are connected to other compartments by connector walls 35. Connector walls 35 together form a housing 39 within which the second cylindrical tube 28 is located.

The apparatus further includes a base plate 36 upon which the carousel 16 rotates. In this embodiment, the base plate 36 has clips 38. Together clips 38 and base plate 36 comprise a ring lock 37. The clips 38 assist in securing the cylindrical tube 22 of the stand 14 to the carousel 16, however are not necessary. The cylindrical tube 22 includes indentations 40 that match up with the clips 38 of the ring lock. The clips 38 are attached to the indentations 40 so that the apparatus 10 can be lifted and carried as one unit. The simple 3-piece apparatus 10, having stand 14, cylinder 16 and base plate 36 allows for quick and easy assembly.

When assembled, as pictured in FIG. 1, the skirt 20 of the stand 14 rests outside of the carousel 16 and the first cylindrical tube 22 of the stand 14 has a coaxial relationship with the second cylindrical tube 28 of the carousel 16.

Figure 3A:
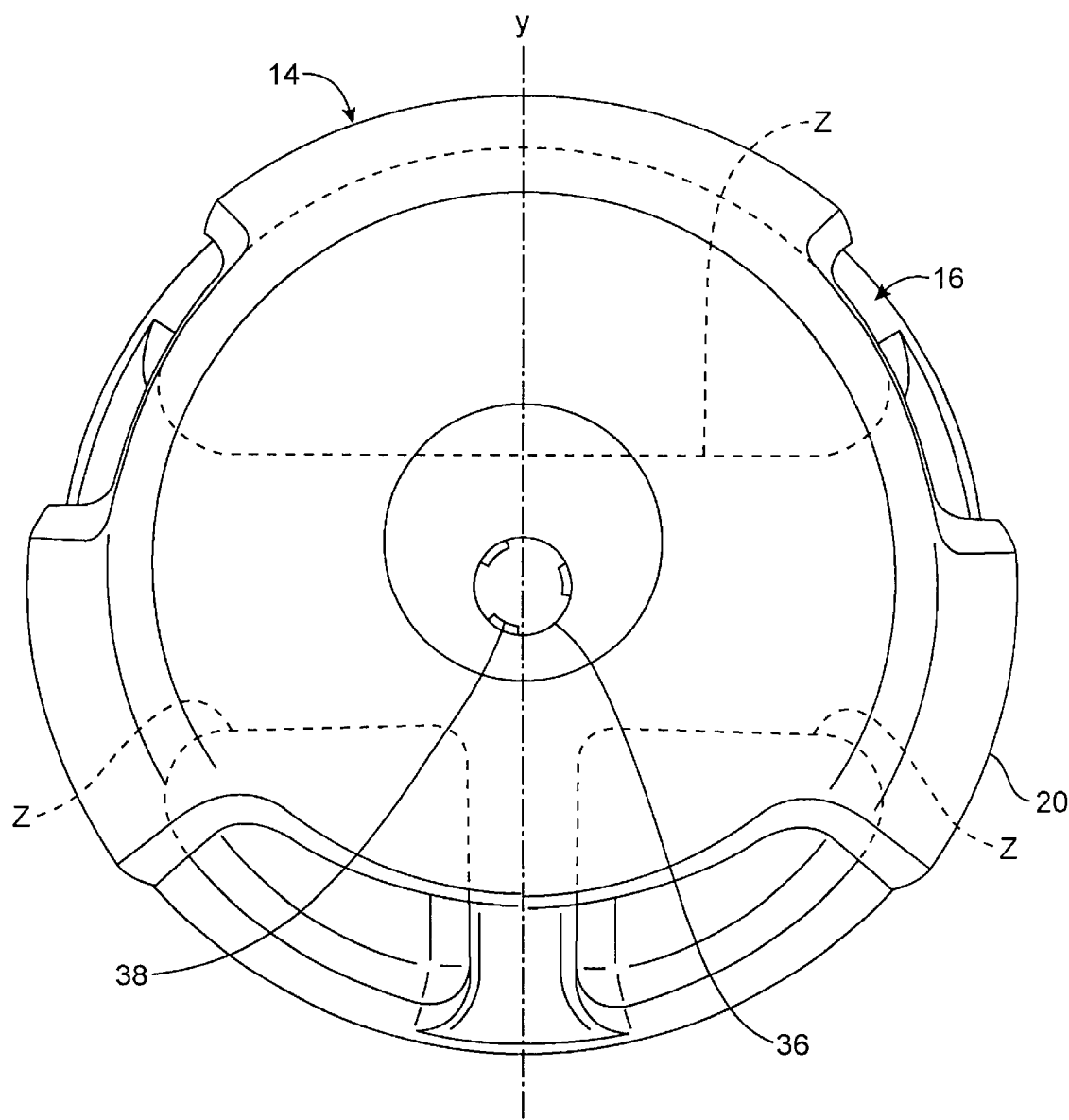
FIG. 3A is a first top view of the apparatus of FIG. 1.
Figure 3B:
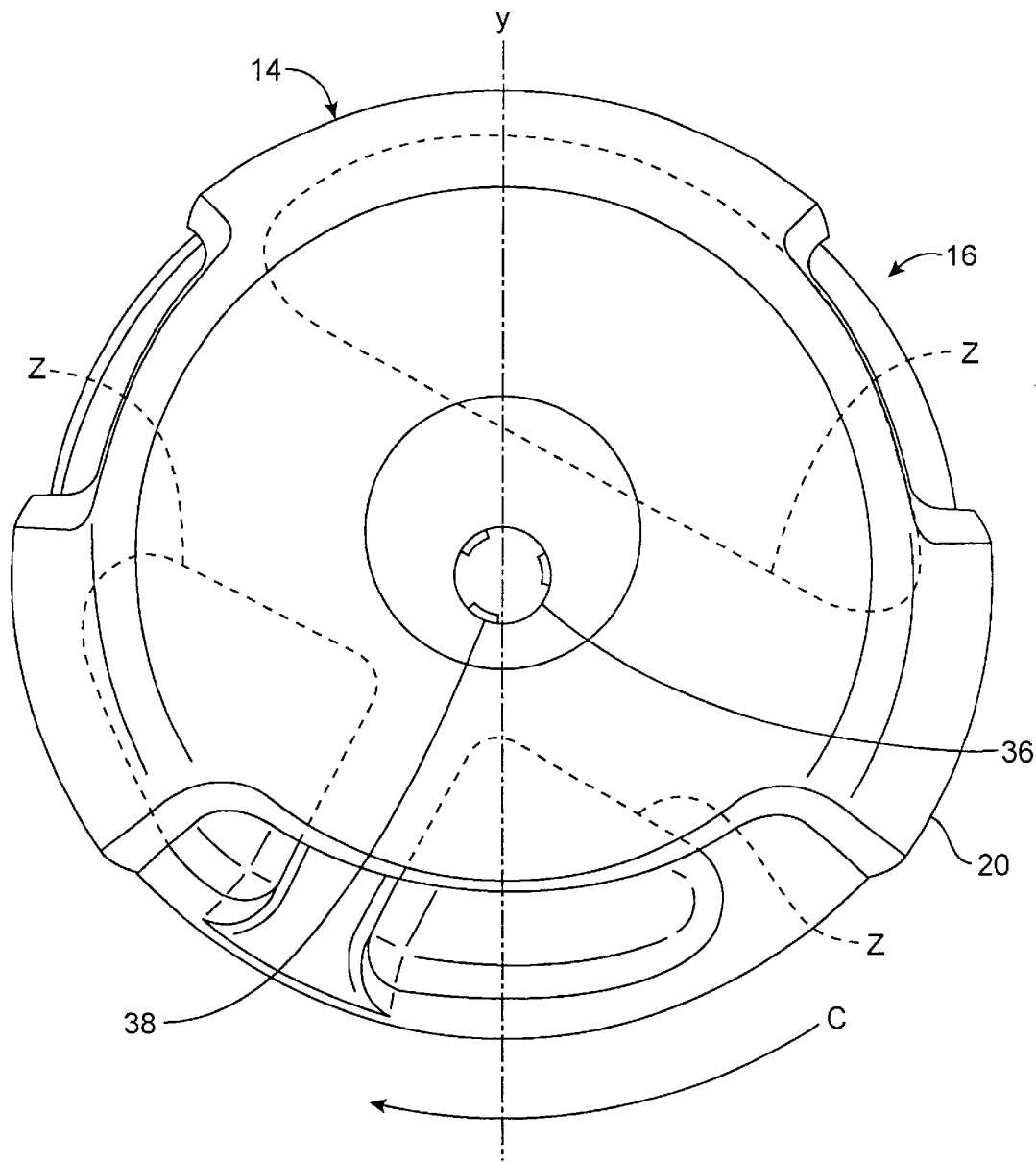
FIG. 3B is a second top view of the apparatus of FIG. 1.

With reference to FIG. 3A and FIG. 3B, the apparatus 10 is seen in a pre-rotation position and a post-rotation position, respectively. An alignment line Y is shown to indicate movement of the carousel 16. Dotted lines Z indicate the position of some of the carousel walls beneath the surface of the stand 14. In FIG. 3A, the carousel walls Z are substantially perpendicular to the alignment line Y. In FIG. 3B, the carousel 16 has been rotated in a clockwise direction as indicated by the arrow C and it is seen that the carousel walls are no longer perpendicular to line Y. When comparing FIG. 3A to FIG. 3B it is seen that the stand 14 and the base plate 36 (here including clips 38) remain stationary, as they are in the same position with respect to line Y, while the carousel 16 rotates.

Figure 4:
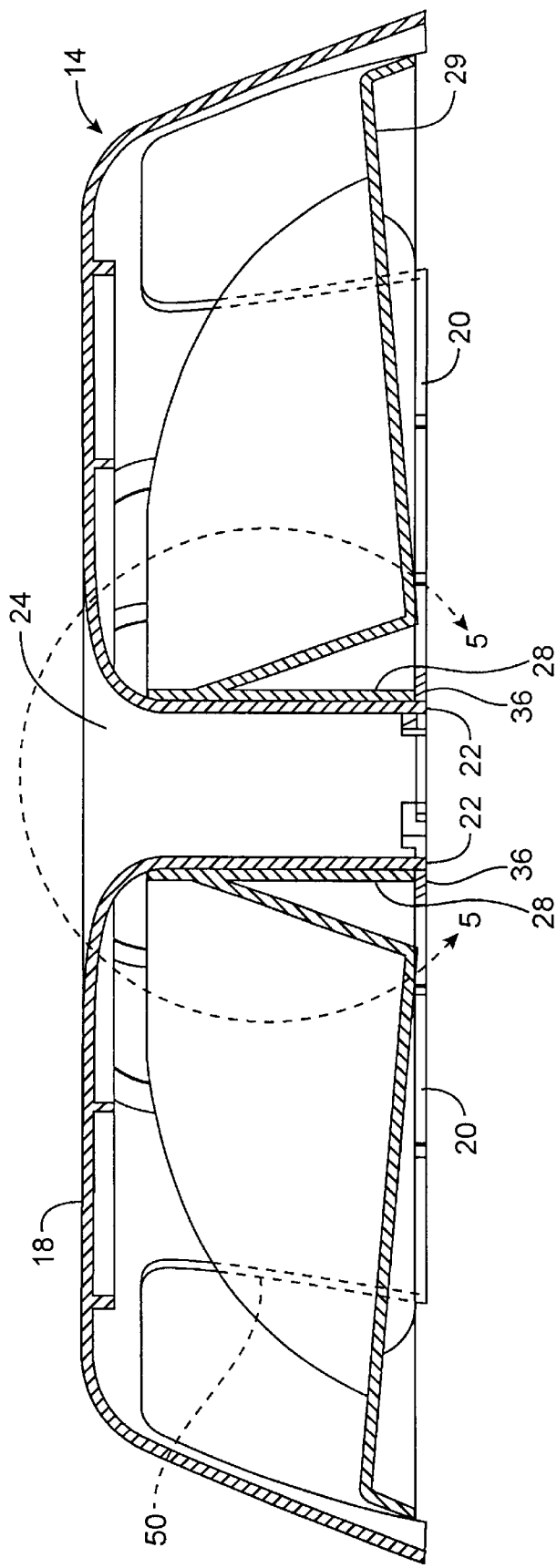
FIG. 4 is a cross sectional side view of the apparatus of FIG. 1.

With reference to FIG. 4, it is seen that the cylindrical tube 22 and the peripheral skirt 20 of the stand 14 terminate in the same horizontal plane. Cylindrical tube 22 fits within cylindrical tube 28 and an opening 60 (FIG. 2) of the base plate 36. Cylindrical tube 22 and skirt 20 terminate in the same plane as the base plate 36.

Figure 5:
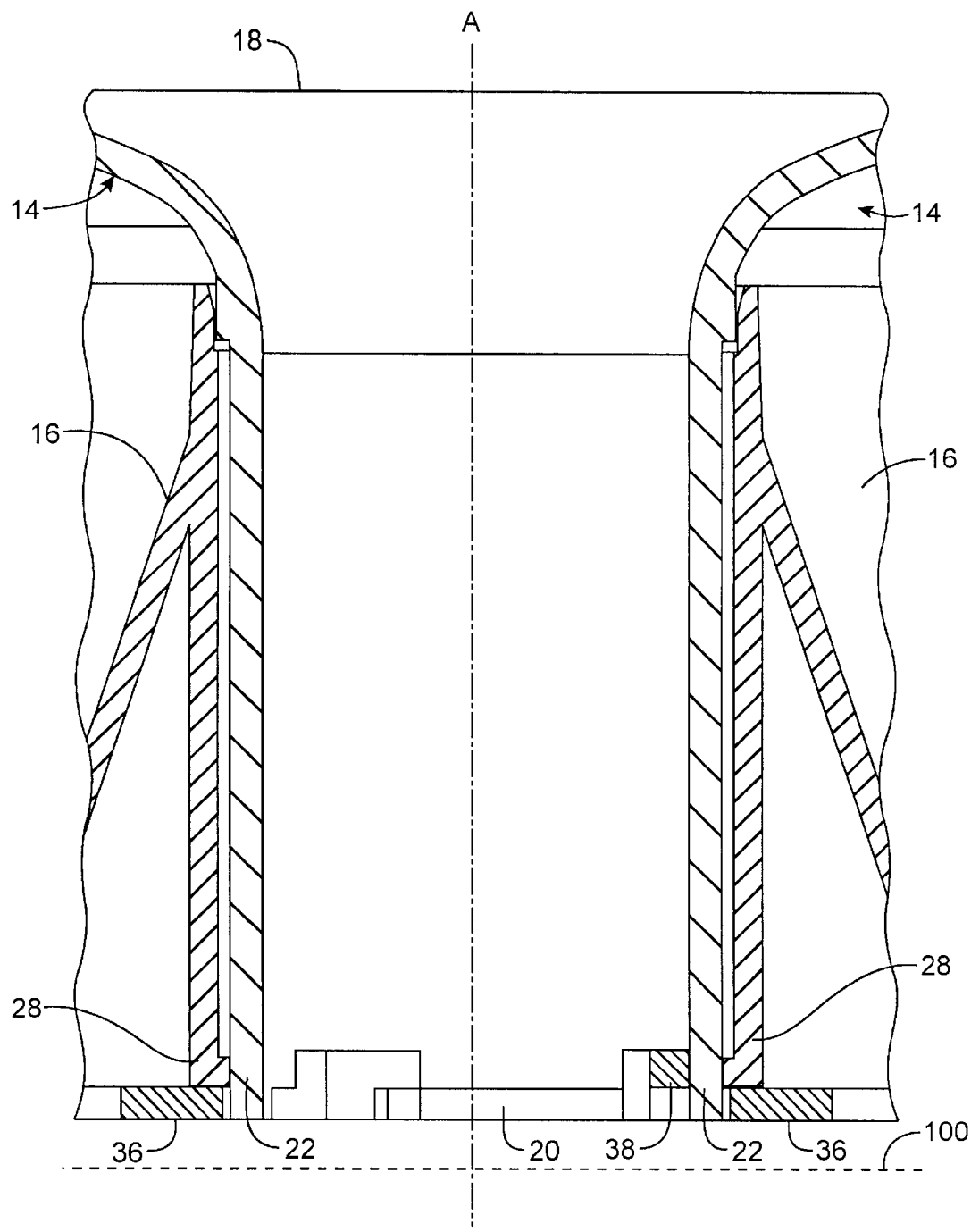
FIG. 5 is a partial cross sectional side view of the apparatus of FIG. 4.

With reference to FIG. 5, there is seen a partial cross sectional view of the apparatus taken along the lines 5—5 delineated in FIG. 4. The carousel 16 is elevated in relation to the stand 14, by base plate 36, which comprises for example ring lock 37 having clips 38. The base plate 36 elevates the carousel 16 above a table or desk surface 100. This prevents marring or scratching of the table surface as the carousel 16 rotates on the base plate 36, not the table surface 100. The base plate 36 provides a low friction bearing surface for the carousel 16 to rotate on and eliminates the need for extra parts such as wheels for providing low friction rotatability. The carousel 16 rotates about the tube 22 and beneath the top 18 while the stand 14 and the base plate 36 remain stationary. The surface of contact of the base plate 36 and the carousel tube 22 is close to the axis of rotation and therefore generates smooth and predictable friction.

Tight tolerances of the dimensions of the cylinders 22 and 28 enable minimal tilt or no tilt of the carousel relative to the table surface 100. The first cylindrical tube 22 having a vertical axis A, and found for example within the second cylindrical tube 28, acts as an axle about which the second cylindrical tube 28 rotates. The coaxial relationship keeps the carousel 16 centered beneath the stand 14 and also provides a bearing surface for the stand to spin.

Figure 6:
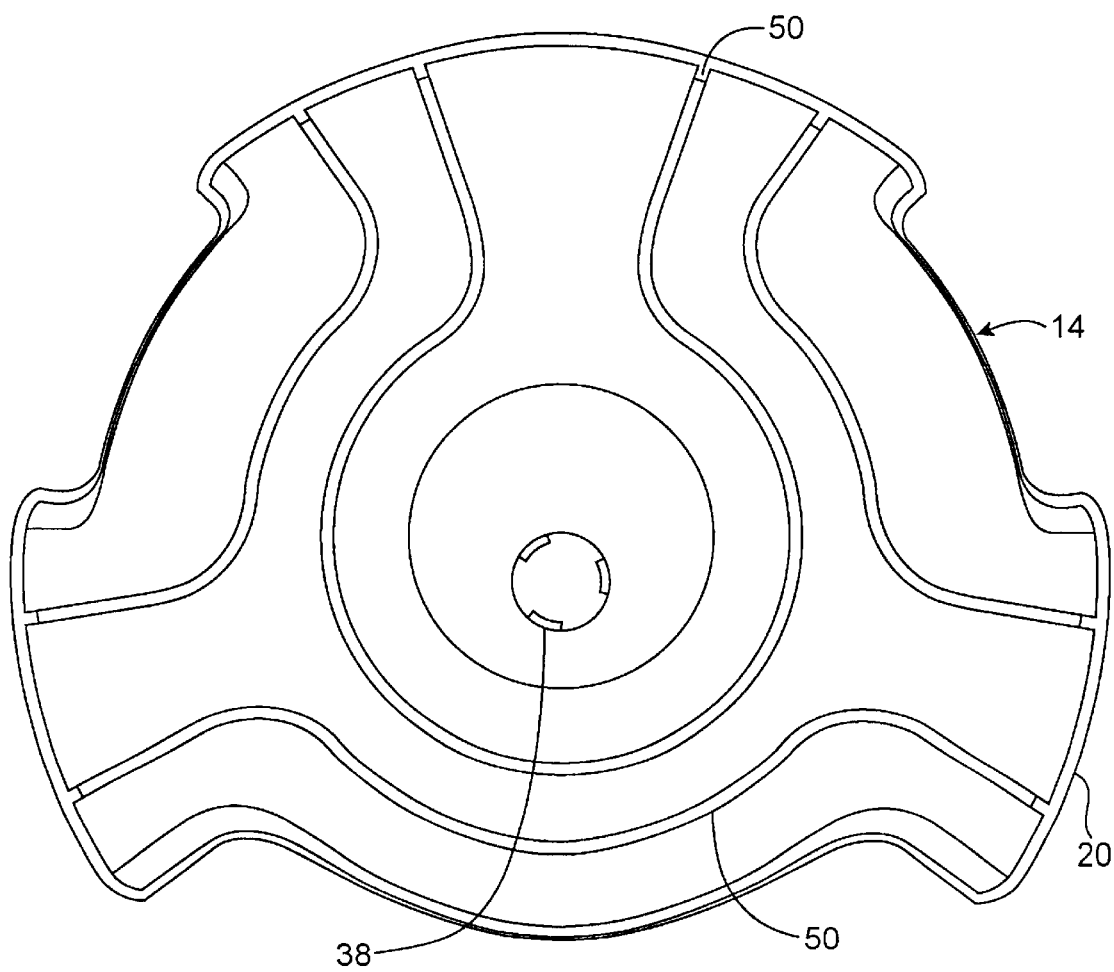
FIG. 6 is a top view of the stand of the apparatus of FIG. 1.

In FIG. 6, support ribs 50 located on an undersurface of the stand 14 are seen. Translucent plastic used in this embodiment allows the ribs 50 to be seen from the top view. The ribs 50 flow in multiple directions and serve to strengthen the peripheral skirt 20 and the top surface 18 on which the monitor 12 sits. The ribs 50 are for example approximately 2 mm thick.

Figure 7:
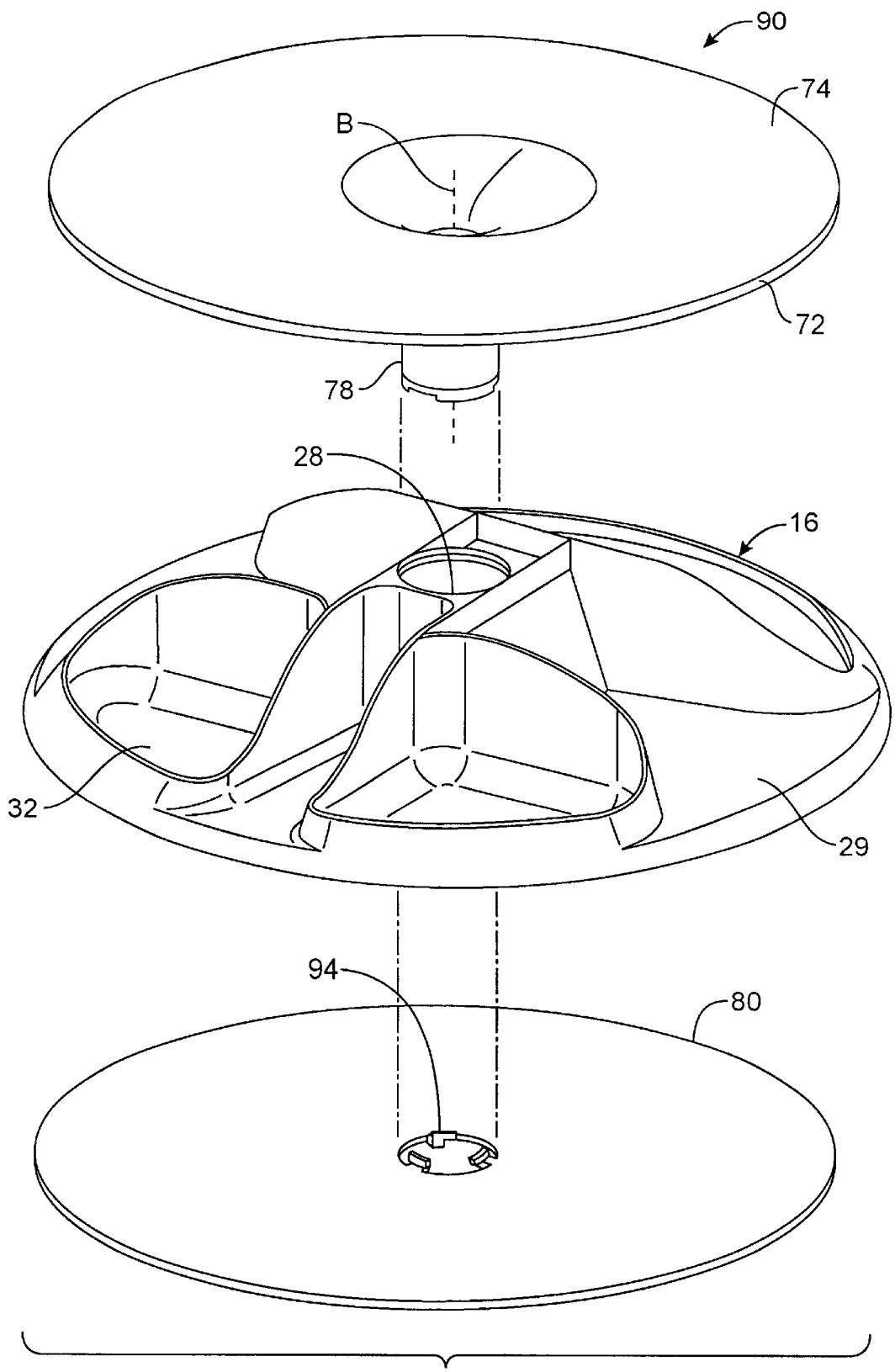
FIG. 7 is an exploded view of an alternative embodiment of the apparatus of the present invention.

Referring to FIG. 7, there is seen an alternative embodiment 90 of the apparatus of the present invention. In this embodiment, a stand 72 comprises a top surface 74 and a cylindrical tube 78 having a vertical axis B. The carousel 16 remains as described previously. Base plate 80 is wider than plate 36. Plate 80 has substantially the same diameter of the carousel base 29. The base plate 80 provides a low friction bearing surface upon which the carousel 16 rotates. It also assists supporting some of the weight of the monitor. In one example, this embodiment includes clips 94 or other mechanisms known in the art for securing the stand 14 to the carousel 16.

The apparatus of the present invention provides a secure support for a computer monitor or the like and maximal use of space beneath a monitor and in between a monitor and keyboard that oftentimes goes unused. Additionally, the apparatus 10 allows for organized storage of and easy access to many items needed for office or home use.

What is claimed is:

1. A combined support and rotary storage apparatus for use with a computer monitor, comprising:
    an integral, one-piece computer monitor stand having a first cylindrical tube having an axis and a top;
    a carousel having a base and a second cylindrical tube extending upward from said base, wherein said second cylindrical tube coaxially surrounds said first cylindrical tube; and
    a base plate, having an opening, maintaining an elevated position of the second cylindrical tube relative to the first cylindrical tube.

2. The apparatus of claim 1 wherein said first cylindrical tube fits in said base plate opening and terminates in the same horizontal plane as said base plate.

3. The apparatus of claim 1 wherein said base plate is a ring lock.

4. The apparatus of claim 3 wherein said top includes a peripheral support skirt extending downward from said top wherein said skirt and said first tube terminate in the same horizontal plane.

5. The apparatus of claim 1 wherein said base plate is substantially the same size as said top.

6. The apparatus of claim 1 wherein said base plate is circular.

7. The apparatus of claim 6 wherein said top is circular.

8. The apparatus of claim 7 wherein said top and said base have substantially the same diameter.

9. The apparatus of claim 1 wherein said carousel includes compartments.

10. The apparatus of claim 1 wherein said top has ribs.

11. The apparatus of claim 1 wherein the diameter of said first cylindrical tube ranges from 1–3 inches.

12. The apparatus of claim 1 wherein a diameter of said second cylindrical tube is slightly wider than a diameter of said first cylindrical tube.

13. The apparatus of claim 1 wherein the thickness of said first cylindrical tube and said second cylindrical tube is about 3 mm.

14. A combined support and rotary storage apparatus for use with a computer monitor, comprising:
   a stand having a top with a first cylindrical tube extending downward from said top and a peripheral support skirt extending downward from said top, wherein said skirt and said tube terminate in the same horizontal plane;
   a carousel having a base and a second cylindrical tube extending upward from said base wherein said first cylindrical tube is coaxial with said second cylindrical tube and said support skirt rests radially outside of said base; and
   a ring lock maintaining an elevated position of the second cylindrical tube relative to the first cylindrical tube wherein said carousel rotates about said first tube.

15. The apparatus of claim 14 wherein said apparatus is plastic.

16. The apparatus of claim 14 wherein said base has a lip around its circumference.

17. The apparatus of claim 14 wherein said ring lock includes an opening and said first and second cylindrical tubes align with said opening and said first tube fits within said opening.

18. The apparatus of claim 14 wherein said carousel includes a lip around an edge of said carousel.

19. The apparatus of claim 18 wherein said carousel includes a compartment.

20. The apparatus of claim 19 wherein said lip is a wall for said compartment.

21. A combined support and rotary storage apparatus for use with a computer monitor, comprising:
   a first cylindrical tube having an axis and a top;
   a carousel having a base and a second cylindrical tube extending upward from said base, wherein said second cylindrical tube coaxially surrounds said first cylindrical tube; and
   a base plate, having an opening, maintaining an elevated position of the second cylindrical tube relative to the first cylindrical tube;
   wherein said first cylindrical tube fits in said base plate opening and terminates in the same horizontal plane as said base plate.

22. A combined support and rotary storage apparatus for use with a computer monitor, comprising:
   a first cylindrical tube having an axis and a top;
   a carousel having a base and a second cylindrical tube extending upward from said base, wherein said second cylindrical tube coaxially surrounds said first cylindrical tube; and
   a base plate, having an opening, maintaining an elevated position of the second cylindrical tube relative to the first cylindrical tube, wherein said base plate is a ring lock.

23. The apparatus of claim 22 wherein said top includes a peripheral support skirt extending downward from said top wherein said skirt and said first tube terminate in the same horizontal plane.

24. A combined support and rotary storage apparatus for use with a computer monitor, comprising:
   a first cylindrical tube having an axis and a top;
   a carousel having a base and a second cylindrical tube extending upward from said base, wherein said second cylindrical tube coaxially surrounds said first cylindrical tube; and
   a base plate, having an opening, maintaining an elevated position of the second cylindrical tube relative to the first cylindrical tube, wherein said base plate is substantially the same size as said top.

25. A combined support and rotary storage apparatus for use with a computer monitor, comprising:
   a first cylindrical tube having an axis and a top, wherein said top is circular;
   a carousel having a base and a second cylindrical tube extending upward from said base, wherein said second cylindrical tube coaxially surrounds said first cylindrical tube; and
   a base plate, having an opening, maintaining an elevated position of the second cylindrical tube relative to the first cylindrical tube, wherein said base plate is circular.

26. The apparatus of claim 25 wherein said top and said base have substantially the same diameter.

27. A combined support and rotary storage apparatus for use with a computer monitor, comprising:
   a first cylindrical tube having an axis and a top, wherein said top has ribs;
   a carousel having a base and a second cylindrical tube extending upward from said base, wherein said second cylindrical tube coaxially surrounds said first cylindrical tube; and
   a base plate, having an opening, maintaining an elevated position of the second cylindrical tube relative to the first cylindrical tube.

* * * * *